May 22, 1934.  J. R. HOGE  1,959,428
GLASSWARE FORMING MACHINE
Filed March 10, 1932  5 Sheets-Sheet 3

Inventor
John Ralph Hoge
By J. F. Rule,
Attorney

May 22, 1934.  J. R. HOGE  1,959,428
GLASSWARE FORMING MACHINE
Filed March 10, 1932   5 Sheets-Sheet 4
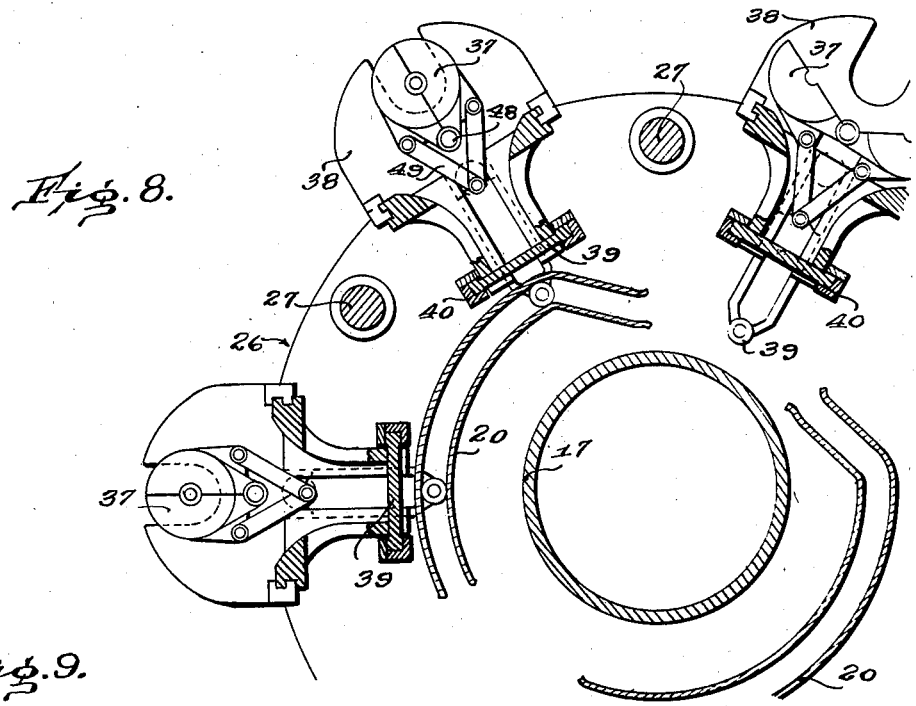
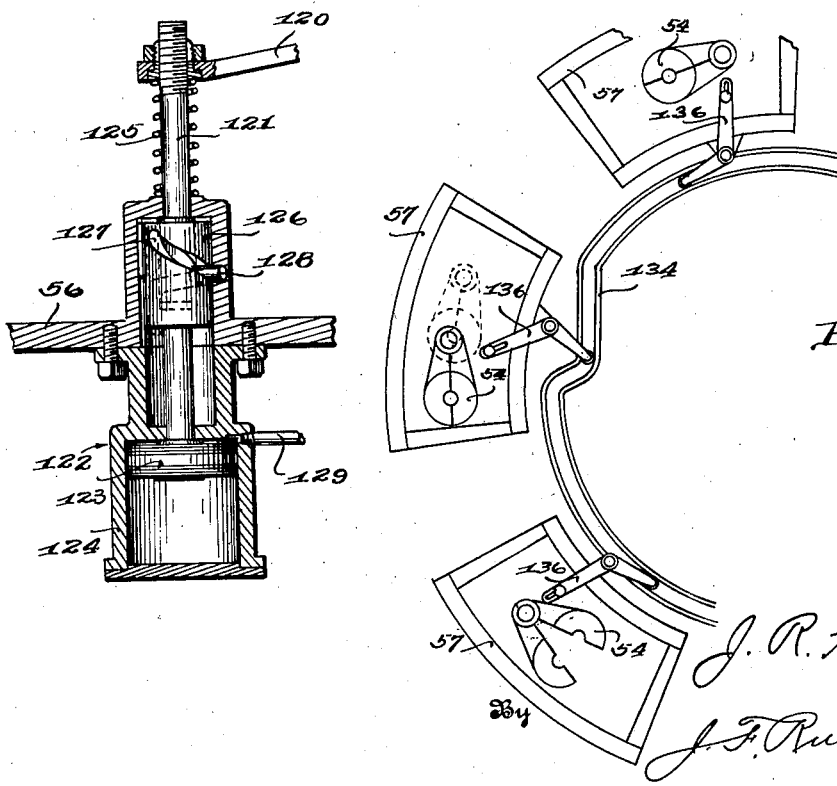

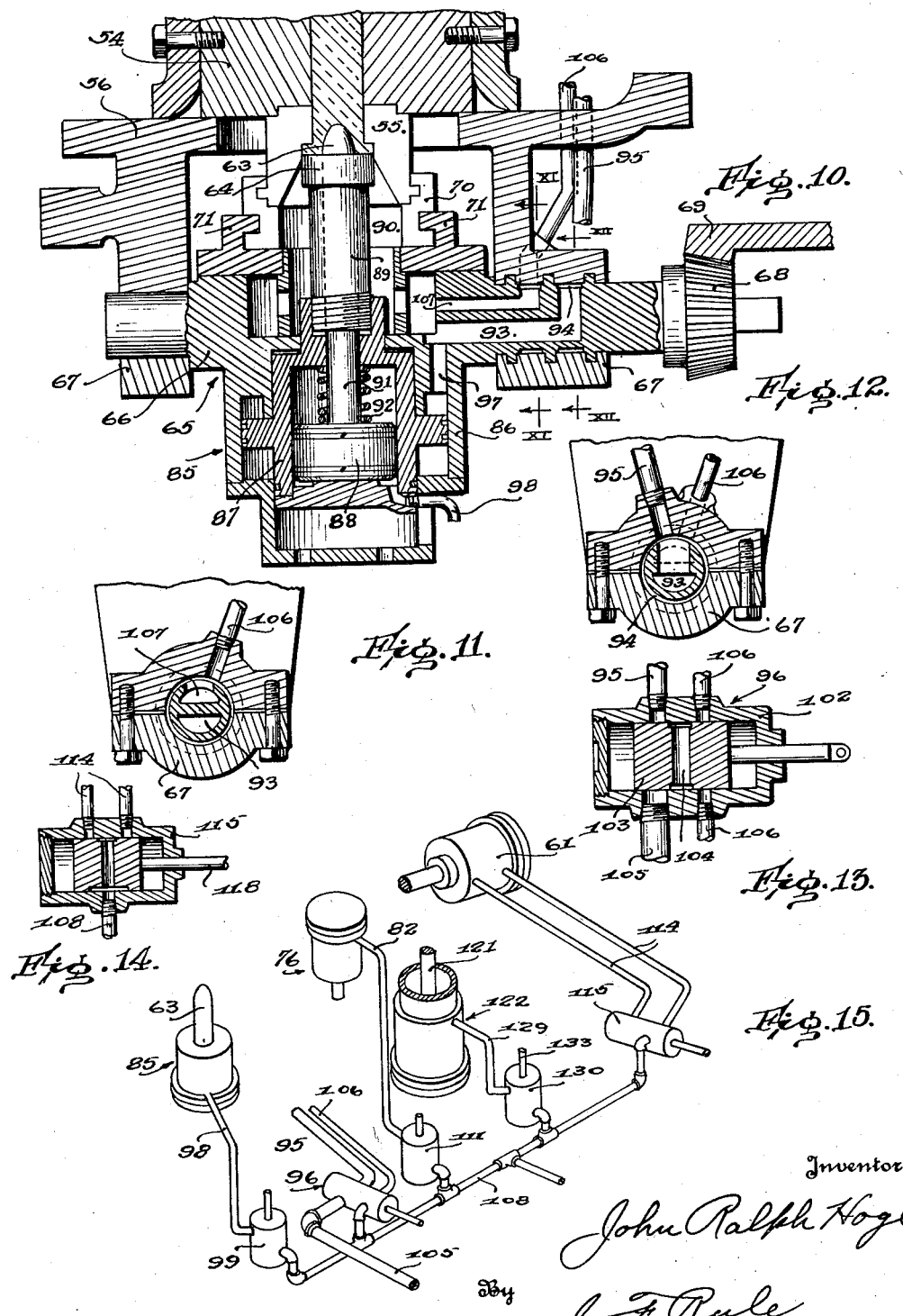

Patented May 22, 1934

1,959,428

UNITED STATES PATENT OFFICE 1,959,428

GLASSWARE FORMING MACHINE

John Ralph Hoge, Toledo, Ohio, assignor to Owens-Illinois Glass Company, a corporation of Ohio Application March 10, 1932, Serial No. 597,989

5 Claims. (Cl. 49—9)

The present invention relates to improvements in glassware forming machines and more especially to machines embodying mold carriages which are rotated to thereby bring mold groups thereon to a charging position where mold charges of molten glass are delivered to blank molds mounted on the carriages.

An object is the provision in a machine of the above character of means for compacting the mold charges in the blank molds by projecting a combined neck forming and pressing plunger into the neck mold after the usual charging operation.

Another object is the provision of means for applying vacuum to the blank molds at the time the mold charge initially enters the cavity and while it remains unsevered from the supply body. Thus the time interval required to transfer mold charges from the supply body to the blank molds may be materially shortened as compared with charging operations effected without the use of vacuum.

A further object is the provision of novel means involving the use of both vacuum and air under pressure for operating a finish ring and combined neck forming and pressing plunger.

Other objects will be in part apparent and in part pointed out hereinafter.

In the drawings:

Fig. 7 is a plan view illustrating more or less diagrammatically the relative positions of the blank mold groups during gathering of a mold charge.

Fig. 8 is a sectional plan view of several finishing mold units and their operating cams.

Fig. 9 is a sectional elevational view of the baffle plate operating mechanism.

Fig. 10 is a detail sectional view showing the turnover unit including the plunger operating mechanism.

Fig. 11 is a sectional view taken substantially along the line XI—XI of Fig. 10.

Fig. 12 is a sectional view taken along the line XII—XII of Fig. 10.

Fig. 13 is a detail sectional view of the air and vacuum control valve.

Fig. 14 is a sectional view of the valve for regulating the flow of air to the blank mold operating motor.

Fig. 15 is a perspective view diagrammatically illustrating the control means for one blank mold group.

In more or less general terms the present invention comprises an annular series of mold groups which are rotated continuously about a vertical axis for the purposes of bringing them in succession to a mold charging station or position where the blank molds are momentarily held stationary with their charging openings facing upwardly in register with the bottom outlet orifice of a boot or forehearth, said boot containing a supply of molten glass. Such rotation of the molds also brings them to other positions at which various operations on the glass are performed, as will be brought out hereinafter. The construction is such that while a blank mold is stationary beneath the glass feeder during the charging operation, the remaining mold groups continue their normal rotary movement. The blank mold after receiving a mold charge of molten glass is advanced to its original normal operating position relative to the other mold groups. The blank forming operation including compacting the glass is then completed. Immediately thereafter the blank mold is opened and the neck mold inverted as part of the operation whereby the blank or parison is transferred to the corresponding finishing mold in which said blank or parison is expanded to its finished form.

More specifically, the machine in conjunction with which one embodiment of my invention is shown, includes an annular series of mold groups 15 or heads, mounted for continuous rotation about the axis of a vertical central column 17, which is suitably supported on a wheeled base 18.

Figure 2:
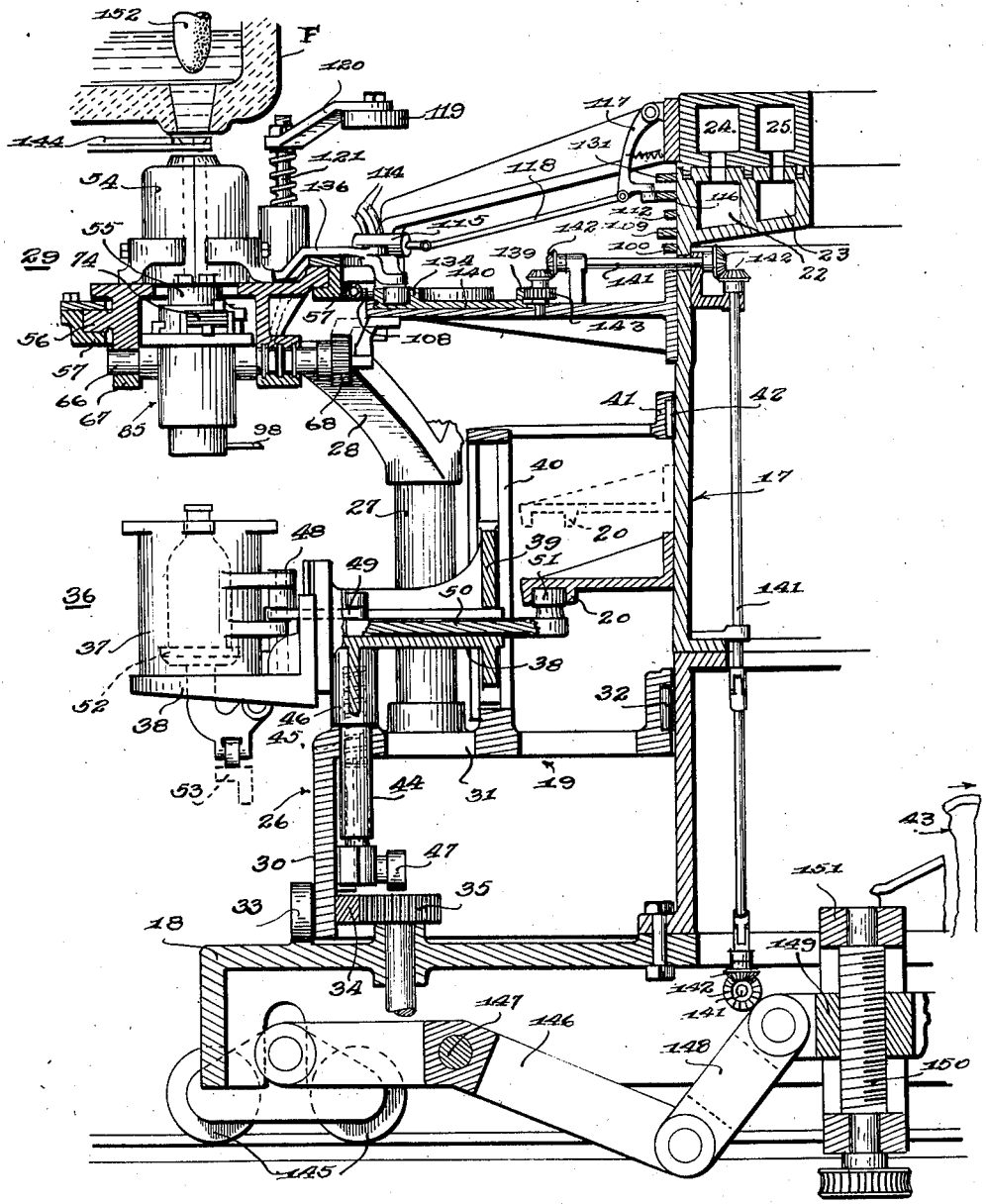
Fig. 2 is a vertical sectional elevational view showing one mold group in the charging zone or position.

The central column 17 which is stationary and rotatably supports a mold carriage 19, also has mounted thereon stationary cams 20 which alternately open and close finishing molds, an adjustable cam which constitutes part of mechanism for imparting a negative movement to the blank molds and holding them stationary at the charging station, and stationary circular vacuum and air chambers 22 and 23, respectively, which are in constant communication with rotary vacuum and air chambers 24 and 25 at the upper end of the mold carriage 19. Other cams which regulate and control the application of air to the various parts are mounted upon the upper end of the stationary column (Fig. 2) as and for the purposes to be pointed out hereinafter.

The mold carriage 19 upon which the series of mold groups or heads are supported, consists of a circular drum-like base 26 and an annular series of vertical posts 27 arising from the base, the upper ends of said posts carrying substantially Y-shaped brackets 28 designed for supporting engagement with the blank mold units 29. The drum-like base portion 26 of the mold carriage consists of a circular outer wall 30 and a horizontally disposed top 31, the latter carrying roller bearings 32 or the like antifriction devices which engage the outer surface of the central column 17. Rollers 33 adjacent the lower margin of the circular wall 30 support the mold carriage in spaced relation to the base 18. A ring gear 34 on the circular wall 30 runs in mesh with a driving pinion 35 which in turn may have operative connection with an electric motor or the like (not shown). The ring gear and pinion provide means for continuously rotating the mold carriage and therewith the set of mold groups or heads.

The finishing mold units 36 are directly supported by the drum-like base 26 of the mold carriage, being mounted thereon for up and down movement along a straight line between a position in which blanks or parisons are transferred to and expanded in the finishing molds and another position in which these molds are opened and the finished articles discharged therefrom. The construction involved consists of a partible finishing mold 37 mounted upon a finishing mold carrier 38, the extreme inner end of which carries a slide 39 running in vertical slideways 40. These slideways extend upwardly from the top 31 of the drum-like base 26 and have their upper ends suitably connected to a collar 41 which encircles the central column 17. Antifriction rollers 42 are disposed between this collar and the central column. The finishing mold carrier is adapted to be moved up and down by means of a stationary cam 43 (Fig. 2) which is mounted on the upper side of the wheeled base 18, said cam operating through a yieldable connector in the form of a rod 44 depending from the lower side of the carrier and projecting through the guide 46 in the mold carriage. This rod 44 is formed of telescopic sections and includes a compression coil spring 45 which permits a limited degree of movement between the sections. A cam roller 47 on the lower end of this rod 44 is adapted to ride upon the stationary cam 43 at times. With this construction the finishing mold 37 may be held in engagement with the corresponding neck mold by spring pressure instead of by a rigid or non-resilient operating device and thereby avoid breaking or unduly straining the various parts involved in this operation. The mold 37 consists of two sections pivoted to a vertical hinge pin 48 on the mold carrier. These sections are connected through links 49 to a slide 50, the inner end of which carries a cam roll 51. This cam roll is engaged by the two stationary cams 20 (Figs. 2 and 8) one at a time, which cams together alternately open and close the finishing molds in timed relation to movement of the other molds, as will be apparent hereinafter. A bottom plate 52 of conventional or any preferred form, is hinged to the finishing mold carrier 38 for tilting movement, such movement being regulated and controlled by a stationary cam 53.

Figure 1:
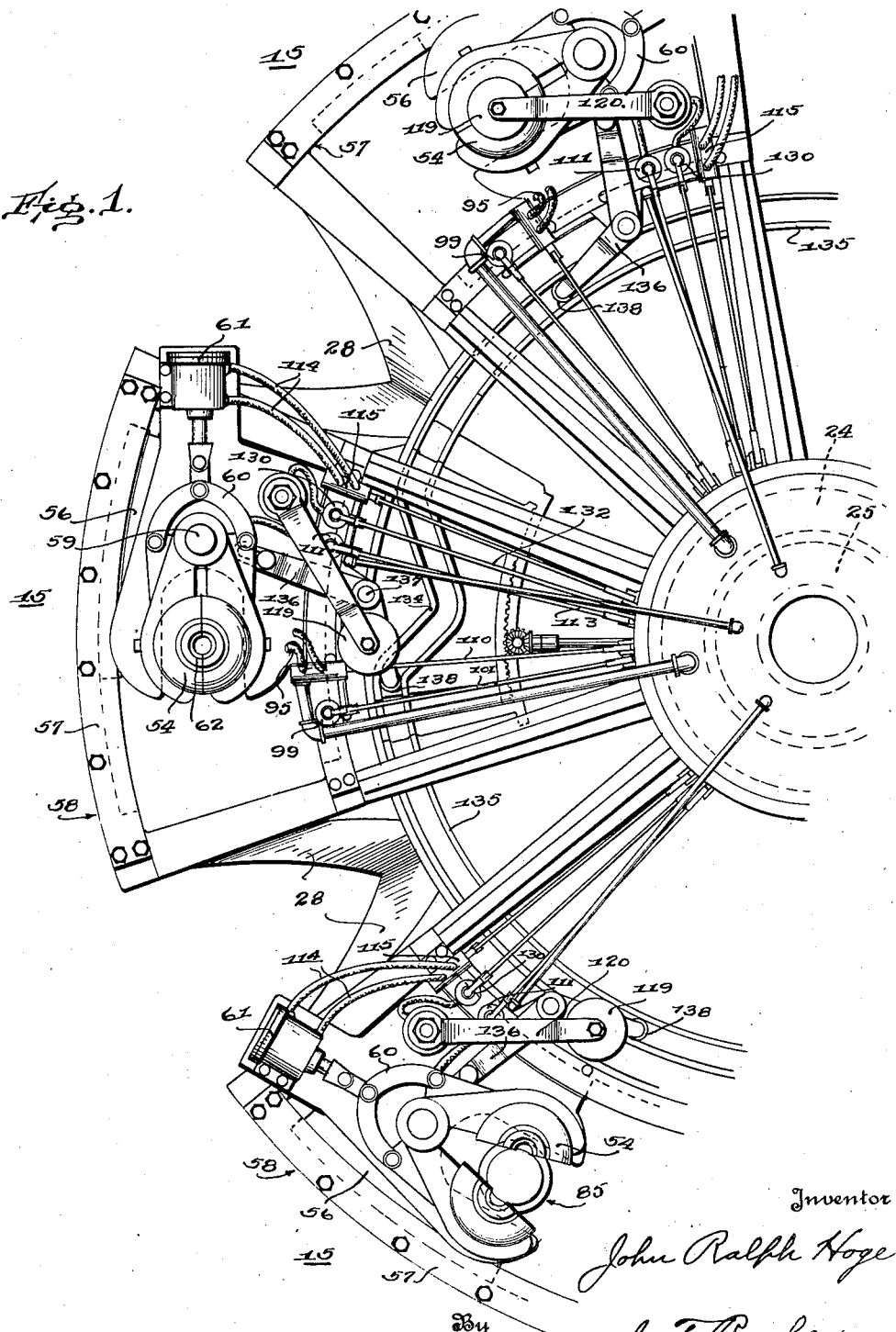
Fig. 1 is a fragmentary top plan view of a glassware forming machine constructed in accordance with the present invention.
Figure 3:
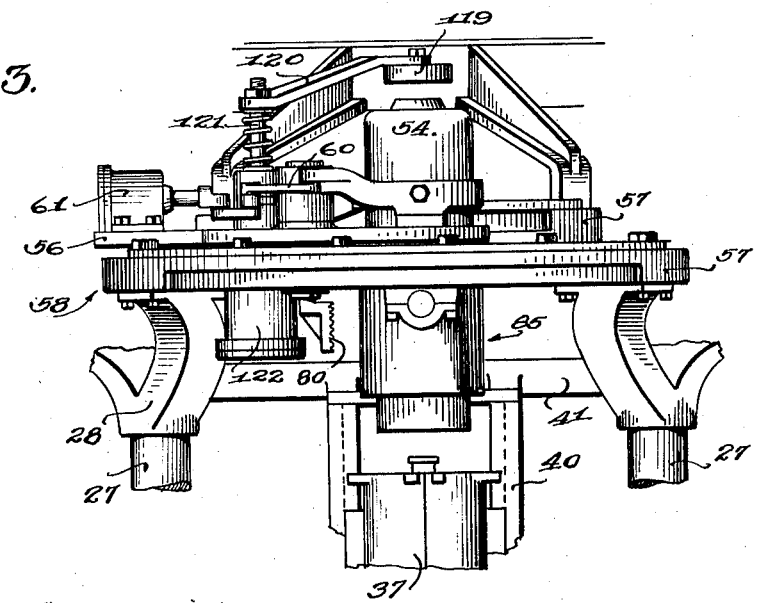
Fig. 3 is a fragmentary front elevational view of one of the blank mold units.
Figure 4:
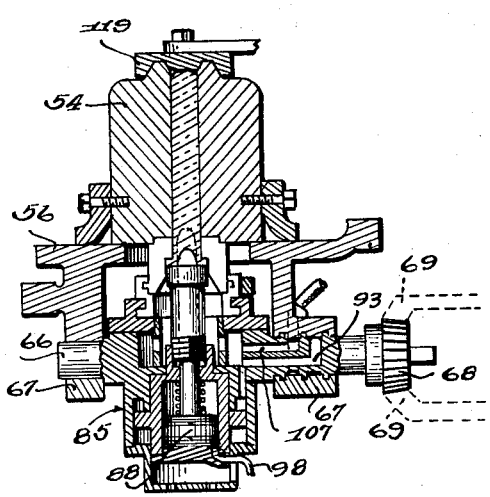
Fig. 4 is a detail sectional view of a blank mold unit showing a baffle plate closing the charging opening of the mold.
Figure 5:
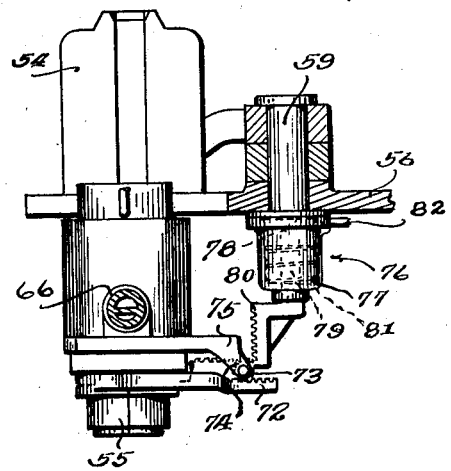
Fig. 5 is a side elevational view of the turnover unit including the neck mold.
Figure 6:
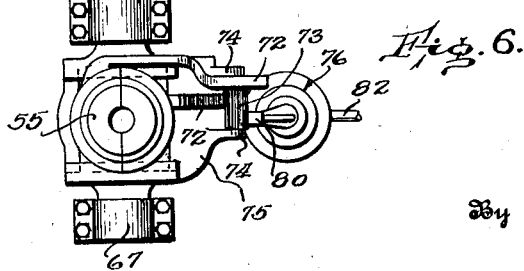
Fig. 6 is a bottom plan view of the turnover unit and operating mechanism therefor.

The blank mold units 29 are individual to the finishing molds 37 and normally occupy positions above and in register with said molds. As stated heretofore, these blank mold units are held stationary or substantially so one at a time at the mold charging position to facilitate delivery of glass thereto. This is accomplished without interfering in any manner or degree with normal rotation of the molds other than the mold actually gathering a mold charge. At the time a mold group arrives at the charging position, suitable mechanism operates to impart backward circumferential movement to the blank mold unit relative to the remaining mold groups as well as the corresponding finishing mold. This negative movement is sufficient to hold the blank mold in register with the bottom outlet of a feeder F until it has received its mold charge. Later the blank mold unit is advanced to its original position in register with the corresponding finishing mold 37. The construction involved may be substantially as follows:

A partible body blank mold 54 and partible neck mold 55 are mounted upon a slidable carrier 56, which consists of an arcuate plate having its longitudinal marginal portions extending into a pair of opposed guideways 57. These guideways constitute portions of an open horizontally extending frame 58 secured to the upper ends of brackets on a pair of vertical posts 27. The body blank mold 54 (Figs. 1 and 3) comprises two sections pivoted to a vertical hinge pin 59 and connected through links 60 to an air motor 61. Both the hinge pin and motor are mounted upon and for movement with the sliding carrier 56. Operation of the motor 61 alternately opens and closes the body blank mold 54. This mold is shown provided with a single cavity, the receiving opening 62 of which is at the upper end. The lower end of the mold is adapted to close about the partible neck mold 55.

The neck mold 55 and a plunger 63, together with a finish ring 64, are carried by an invertible turnover unit 65 which is disposed directly below the corresponding body blank mold 54 on the mold carrier 56. This turnover unit includes a supporting shaft 66 journaled in bearings 67 on the lower side of the slidable carrier 56, said shaft extending radially of the machine and connected at its inner end to a bevel pinion 68. This pinion, due to rotation of the mold carriage, is brought into operative engagement with stationary racks 69 one at a time which impart rotary motion to the pinion first in one direction and then in the other. Thus the turnover unit is inverted and reinverted. These racks are spaced apart circumferentially of the machine and are disposed in relatively different horizontal planes so that they are engaged one at a time by the pinion 68. The turnover unit is thereby moved between two positions in one of which the neck mold 55 cooperates with the corresponding body blank mold, while in the other position it is adapted to cooperate with the finishing mold 37. The upper rack bar inverts the turnover unit for the purpose of suspending a blank or parison in position to be enclosed in the finishing mold.

The other rack bar reinverts the turnover unit and thereby brings the neck mold into position for cooperation with the body blank mold.

The neck mold, plunger, and finish ring construction and operating mechanism therefor, may be substantially as follows. The neck mold consists of two half sections, the parting line of which extends parallel with the axis of the shaft 66 or at right angles to the parting line of the body blank mold 54. These mold sections move along a straight line during opening and closing thereof. Holders 70 individual and separably connected to the neck mold sections, are slidingly supported in a pair of opposed guideways 71 which are suitably mounted upon the shaft 66. Each holder carries a rack bar 72 which is constantly in mesh with a pinion 73. One rack bar engages the upper side of the pinion while the other bar is in mesh with the lower side thereof. This pinion 73 is journaled in bearings 74 at the outer end of a bracket 75 which forms a part of the turnover unit 65. Oscillation of the pinion 73 alternatively opens and closes the corresponding neck mold. For the purpose of oscillating this pinion 73, there is provided a combination air and spring motor 76. This motor which is attached to the lower side of the sliding carrier 56 includes a motor cylinder 77, a piston 78 therein, and a piston rod 79 extending through the lower end of the cylinder and carrying a vertical rack bar 80. A coil spring 81 encircles the piston rod 79 below the piston 78 and yieldingly holds the latter in its uppermost position. Application of air under pressure through a supply pipe 82 forces the piston 78 down and correspondingly moves the rack bar 80 so that the pinion 73 and rack bars 72 are operated to open the neck mold 55.

The plunger 63 and finish ring 64 are mounted for axial movement relative to each other and at times as a unit relative to the neck mold 55. Movement of the plunger and finish ring as a unit places them in or out of operative position with respect to the neck mold, while movement of the plunger relative to the finish ring resulting in additional projection of the plunger into the neck mold, serves to compact the glass which has been delivered to the body blank and neck molds. The construction whereby such operation of the plunger and finish ring may be obtained, includes a combined vacuum and air operated piston motor 85 mounted on the shaft 66 of the turnover unit, diametrically opposite the neck mold and holders therefor. This motor (Fig. 10) includes a vertical cylinder 86, a sleeve piston 87 therein, and a solid piston 88 within the sleeve piston. These two pistons are mounted for movement as a unit at times and movement relative to each other at other times. The sleeve piston 87 is suitably connected at its upper end to a finish ring holder 89 which is disposed within a combined vacuum and air chamber 90. The solid piston 88 is connected to a piston rod 91 to the upper end of which the plunger 63 is secured. A coil spring 92 encircles the piston rod 91 between the solid piston 88 and the upper end of the sleeve piston 87, and normally holds the piston in its lowermost position within the sleeve piston 87.

Both vacuum and air under pressure are employed in moving the pistons in the cylinder 86 for projecting the plunger and finish ring relative to the neck mold. Vacuum alone initially positions the plunger and finish ring in the neck mold while air under pressure is employed in moving the plunger for the purpose of pressing or compacting mold charges in the body blank and neck molds. During the application of vacuum for the purpose of placing the plunger and finish ring in their initial operative positions, vacuum is also applied to the neck mold cavity to insure complete filling of the neck mold with the glass being delivered to the molds. The construction includes the chamber 90 which has direct communication with a vacuum conduit 93 extending lengthwise of the shaft 66. This conduit communicates with an annular external groove 94 which is closed by the bearing 67, said groove having connection with a vacuum pipe 95. This pipe extends upwardly through the sliding carrier 56 where it is connected to a valve 96. This valve, as will be brought out presently, may be operated by a cam and regulates and controls the application of vacuum to said conduit 93 and chamber 90. A passageway 97 provides constant communication between the vacuum conduit 93 in the shaft 66 and the interior of the motor cylinder 85 whereby exhaust of air from said conduit is accompanied by removal of air from the upper end of the motor cylinder 86 with the result that both the sleeve piston 87 and solid piston 88 are moved upward and place the plunger and finish ring in their initial operating positions in the neck mold.

Projection of the plunger 63 relative to the finish ring is effected after glass has been delivered to the blank mold by moving the piston 88 vertically upward within the sleeve piston 87. For this purpose air under pressure is supplied to the lower end of the sleeve piston through a pipe 98. This pipe extends through a vertical slot in the lower end of the motor cylinder 85 so that it will not interfere with up and down movement of the sleeve piston. A valve 99 regulates the flow of air under pressure into the pipe 98, said valve being operated at regular time intervals by cam mechanism including a stationary cam 100 (Fig. 2) on the central column and a push rod 101 which is operatively connected to the valve 99. This push rod may be operated by the cam 100 working through a lever or the like (not shown).

The valve 96 referred to above as regulating and controlling the application of vacuum to the blank mold 54 and motor 85, also regulates the supply of air under pressure to the neck mold and finishing mold at the time the blanks or parisons are being finally expanded in the finishing mold. This valve includes a cylindrical housing 102 and a reciprocating piston 103 therein. This piston 103 is provided with a transverse port 104 which during the application of vacuum to the blank mold, establishes communication between the vacuum pipe 95 and a main vacuum supply pipe 105. In another position this port 104 establishes communication between air conduits 106 which are connected to opposite sides of the valve housing 102. One of these air pipes 106 is in constant communication with an air conduit 107 extending parallel with the vacuum conduit 93 in the shaft 66, said conduit leading to the chamber 90 in the turnoved unit. The other air pipe 106 is connected to a header 108 in which air under pressure is constantly maintained. The piston 103 of the valve 96 is adapted to be reciprocated at regular time intervals by means of the cam 109 which operates through a push rod 110. This cam is of such form that at times it places the piston 103 in a neutral position wherein the port 104 is disposed centrally between the vacuum and air supply pipes thereby shutting off the air and vacuum from the blank and neck molds.

The piston motor 76 which alternately opens and closes the neck mold, is connected to the header 108 by means of the pipe 82 referred to heretofore and a valve 111. This valve is operated periodically by a stationary cam 112 which is intended to reciprocate a push rod 113 (Fig. 1), said rod being connected to the valve and cam by bell crank levers or the like (not shown). The piston motor 61 referred to heretofore as effecting alternate opening and closing of the body blank mold 54, is connected by pipes 114 to a regulating valve 115 which in turn is suitably connected to the header 108. A stationary cam 116 operates through a lever 117 and push rod 118 to change the position of the valve at regular time intervals. Thus the motor is caused to alternately open and close the mold.

For the purpose of closing the receiving opening of the body blank mold 54 after the charging operation has been completed, a baffle plate 119 is mounted upon each blank mold carrier 56. This baffle plate is normally positioned at one side of the blank mold and fixed to the outer end of an arm 120 which extends radially from the upper end of a vertical rock shaft 121. A piston motor 122 (Figs. 3 and 9) mounted on the blank mold carrier 56 is operatively connected to the rock shaft 121. This connection may consist of a piston 123 arranged within the motor cylinder 124 and suitably secured to the lower end of the rock shaft. A coil spring 125 encircling the rock shaft between the upper end of the motor and the arm 120, normally and yieldingly supports the baffle plate in its inoperative position. Downward movement of the piston 123 and rock shaft 121 is accompanied by rotary movement of the rock shaft whereby the baffle plate is brought into sealing contact with the receiving opening of the body blank mold. Such rotary movement is obtained through the provision of a sleeve 126 in the upper end of the motor cylinder, said sleeve having a spiral slot 127 therein into which a pin 128 carried by said shaft projects. A supply pipe 129 for conducting air under pressure to the motor 122 connects the motor cylinder 124 and the header 108. A valve 130 (Figs. 1 and 15) regulates the flow of air to the motor 122. Operation of this valve is controlled by a stationary cam 131 (Fig. 2) which reciprocates a push rod 132 (Fig. 1) at regular time intervals. This push rod has one end connected to the valve stem 133 and its other end connected to a bell crank lever or the like (not shown) which is actuated by said cam 131. As brought out heretofore, the blank mold units are held substantially, if not absolutely, stationary at the charging position beneath the feeder F.

The mechanism for accomplishing this consists of an adjustable angular cam section 134 forming a part of a continuous stationary cam 135 which controls the relative positions of the blank mold units in their path of travel. Each blank mold carrier 56 is connected to one arm of a bell crank lever 136 which is pivoted to a vertical hinge pin 137, said lever having its other arm connected through a roller 138 to the stationary cam 135. The bell crank lever and angular cam section 134 are of such form and so operate that as the molds arrive at the charging position backward movement is imparted to the carrier 56 sufficient to hold the blank mold in register with the bottom outlet opening in the feeder F. The operating position of the angular cam section 134 may be changed at will to advance or retard the stationary position of the molds. This is accomplished by providing a rack 139 at the inner margin of the slide 140 which carries the adjustable cam section 134. A series of shafts 141 and gears 142 suitably connected together and to a pinion 143 meshing with the rack 139, provide means for advancing or retarding the position of the cam section 134 with regard to the stationary cam 135. Thus the point at which the blank molds are held stationary may be adjusted to thereby obtain accurate alignment of the blank mold cavities and bottom outlet in the feeder boot. Shears 144 arranged in proximity to the lower side of the feeder F may be of conventional or any preferred form, operating in proper timed relation to movement of the mold group.

From time to time it is necessary to change molds in order to produce bottles or jars of different dimensions. This frequently involves the use of molds of different length. Since it is desirable to maintain a definite spacing between the receiving openings of the body blank molds and the feeder outlet, it becomes necessary to change the elevation of the machine thereby compensating for the difference in lengths of the molds. For this purpose the machine base 18 is supported on wheels 145 arranged in pairs at the corners of said base. Each pair of wheels is connected through a lever 146 to a horizontal hinge pin 147 and through links 148 to an adjusting block 149 which is threaded upon a vertical screw 150. This screw which is mounted in a stationary frame 151, is adapted to be rotated to raise or lower the adjusting block 149 and thereby correspondingly move the entire machine.

In operation the mold carriage 19 is rotated continuously so that the mold groups are brought in succession to the charging position beneath the feeder F. The blank and finishing molds occupy the relative positions shown in Fig. 2 during the charging operation. Upon arrival of a mold group at the charging position, the angular cam section 134 rocks the lever 136 with the result that the blank mold carrier 56 is given a backward movement with respect to the movement of the corresponding finishing mold 37 and the remaining mold groups. Such backward movement is sufficient to hold the blank mold stationary with its receiving opening in register with the bottom outlet of the feeder. The plunger 152 in the feeder will now be moved downwardly by any suitable means to expel the glass from the feeder by way of the bottom outlet. As the glass enters and seals the receiving opening of the mold, vacuum is applied to the chamber 90 in the turnover unit. This results in initial positioning of the plunger 63 and finish ring 64 (Fig. 10) within the neck mold 55. Moreover, such application of vacuum materially assists in shortening the time interval necessary to charge the mold and insures complete filling of the neck cavity with glass. Upon completion of the charging operation the bell crank lever 136 (Figs. 1 and 2) operates to return the corresponding blank mold carrier 56 and mechanisms supported thereon, to the relative position occupied prior to the charging operation. This brings the blank mold into register with the corresponding finishing mold. Immediately the baffle plate 119 is placed in sealing contact with the upper end of the body blank mold 54. With the vacuum still applied to the neck cavity, air under pressure is supplied to the piston motor 85 to move the plunger 63 upwardly into the neck mold for the purpose of compacting the glass and forming a solid blank or parison. This completes the blank forming operation. Both vacuum and air under pressure will now be shut off from the blank mold. Thereupon the spring 92 in the piston motor 85 retracts the plunger 63 to its initial operating position shown in Fig. 10. The piston motor 61 is now operated to open the body blank mold 54, leaving a bare blank or parison projecting upwardly from and attached to the neck mold. The turnover unit including this neck mold will now be inverted by partial rotation of the bevel gear 68 due to its engagement with and movement relative to the upper rack bar 69. This results in the bare blank being suspended from the neck mold in position to be enclosed by the finishing mold 37. The cam 43 (Fig. 2) then moves the finishing mold unit upwardly and one of the cams 20 closes this mold about the bare blank such operation following lifting of the bottom plate 52 to its level position. After a period of reheating of the blank or parison in the finishing mold, air under pressure is supplied to the chamber 90 through the pipes 106 and conduits 107. This air operates the piston motor 85 for the purpose of completely retracting the plunger 63 and finish ring 64, and in addition, expands the blank or parison in the finishing mold. Thus the article of glassware is completed. Afterward the application of air under pressure is discontinued and the finishing mold lowered and opened. The bottom plate 52 is tilted and the finished article discharged from the machine. These latter operations may be accomplished in any well known manner.

Modifications may be resorted to within the spirit and scope of the appended claims.

What I claim is:

1. In a glassware forming machine a mold group comprising a horizontally disposed blank mold carrier, a partible blank mold on the upper side of said carrier, a turnover unit including a partible neck mold mounted on the lower side of the carrier, a plunger arranged for projection into the neck mold, a piston motor carried by the turnover unit and operatively connected to the plunger, means for applying vacuum to the neck mold and simultaneously operating the motor to initially position the plunger in the neck mold, means for then operating the motor to additionally project the plunger into the neck mold, and means for sealing the opposite end of the blank mold in advance of said additional projection of the plunger.

2. In a glassware forming machine, a mold group comprising a horizontally disposed blank mold carrier, a partible blank mold mounted on the upper side of the carrier and having an upwardly facing charging opening, a turnover unit mounted on the lower side of the carrier and including a partible neck mold adapted to cooperate with the lower end of the blank mold, a plunger, a piston motor forming a part of the turnover unit and adapted to move the plunger into the neck mold, means for applying vacuum to the neck mold and simultaneously operating said motor to place the plunger in its initial position in the neck mold, a baffle plate, means for placing the baffle plate in position to seal the charging opening after a mold charge of glass has been delivered to the blank and neck molds, and means for then additionally projecting the plunger into the neck mold to thereby compact the glass in said molds.

3. In a glassware forming machine, a mold group comprising a horizontally disposed blank mold carrier, a partible blank mold mounted on the upper side of the carrier and having an upwardly facing charging opening, a turnover unit mounted on lower side of the carrier and including a partible neck mold adapted to cooperate with the lower end of the blank mold, a plunger, a piston motor forming a part of the turnover unit and adapted to move the plunger into the neck mold, means for applying vacuum to the neck mold and simultaneously operating said motor to place the plunger in its initial position in the neck mold, a baffle plate, means for placing the baffle plate in position to seal the charging opening after a mold charge of glass has been delivered to the blank and neck molds, and means for supplying air under pressure to the motor to thereby additionally project the plunger and compact the glass in the molds.

4. In a glassware forming machine, a blank forming unit comprising a partible blank mold, a partible neck mold, a plunger, a finish ring surrounding a portion of the plunger, a piston motor for moving the plunger and finish ring relative to the neck mold, said motor including a vertical cylinder, a sleeve piston therein connected to the finish ring, a piston within the sleeve piston connected to the plunger, means for operating said pistons whereby the plunger and finish ring are moved together into position for cooperation with the neck mold and the plunger then moved relative to the finish ring to compact the glass in said molds, and means for momentarily sealing the end of the blank mold remote from the neck mold.

5. In a glassware forming machine, a blank forming unit comprising a partible blank mold, a partible neck mold, a plunger, a finish ring surrounding a portion of the plunger, a piston motor for moving the plunger and finish ring relative to the neck mold, said motor including a vertical cylinder, a sleeve piston therein connected to the finish ring, a piston within the sleeve piston connected to the plunger, means for applying vacuum to the motor to move both pistons simultaneously and thereby place the plunger and finish ring in their initial operating position in the neck mold, said vacuum applying means also exhausting air from the neck mold, means for closing the end of the blank mold remote from the neck mold, and means for then operating the plunger carrying piston whereby the plunger is caused to move further into the neck mold and compact the glass therein.

JOHN RALPH HOGE.